(12) United States Patent
Fan

(10) Patent No.: US 8,444,102 B2
(45) Date of Patent: May 21, 2013

(54) APPARATUS FOR HOLDING HANDHELD DEVICES

(76) Inventor: Eagle Fan, Hsinchu (TW)

( * ) Notice: Subject to any disclaimer, the term of this patent is extended or adjusted under 35 U.S.C. 154(b) by 226 days.

(21) Appl. No.: 13/052,384

(22) Filed: Mar. 21, 2011

(65) Prior Publication Data

US 2012/0241580 A1 Sep. 27, 2012

(51) Int. Cl.
*A47B 91/00* (2006.01)
(52) U.S. Cl.
USPC ...... 248/346.04; 248/910; 206/320; 206/480; 361/679.3
(58) Field of Classification Search
USPC ..... 248/346.04, 452, 473, 116, 910; 206/320, 206/477, 480; 361/679.3, 679.56
See application file for complete search history.

(56) References Cited

U.S. PATENT DOCUMENTS

| | | | | |
|---|---|---|---|---|
| 2,936,067 A * | 5/1960 | Kaskey | | 206/759 |
| 3,003,997 A * | 10/1961 | Intermill | | 206/759 |
| 3,162,997 A * | 12/1964 | Schmidt | | 368/276 |
| 4,225,038 A * | 9/1980 | Egly | | 206/753 |
| 4,470,571 A * | 9/1984 | Hartman | | 248/452 |
| 5,632,373 A * | 5/1997 | Kumar et al. | | 206/305 |
| 5,691,618 A * | 11/1997 | Kobayashi et al. | | 320/115 |
| 5,836,496 A * | 11/1998 | Levin et al. | | 224/553 |
| 6,095,625 A * | 8/2000 | Harris et al. | | 312/274 |
| 6,127,802 A * | 10/2000 | Lloyd et al. | | 320/113 |
| 6,249,431 B1 * | 6/2001 | Chan | | 361/679.27 |
| 6,483,698 B1 * | 11/2002 | Loh | | 361/679.41 |
| 6,776,385 B1 * | 8/2004 | Chang | | 248/448 |
| 6,840,487 B2 * | 1/2005 | Carnevali | | 248/346.06 |
| 7,591,045 B2 * | 9/2009 | Yang | | 16/286 |
| 7,769,163 B2 * | 8/2010 | Gloede et al. | | 379/455 |
| 7,992,831 B2 * | 8/2011 | Fan | | 248/205.5 |
| 8,186,508 B2 * | 5/2012 | Fan | | 206/320 |
| 8,243,430 B2 * | 8/2012 | Ahn et al. | | 361/679.27 |
| 2003/0089832 A1 * | 5/2003 | Gold | | 248/454 |
| 2005/0231930 A1 * | 10/2005 | Jao | | 361/807 |
| 2007/0227923 A1 * | 10/2007 | Kidakarn | | 206/320 |
| 2009/0072786 A1 * | 3/2009 | Lin et al. | | 320/114 |
| 2009/0278015 A1 * | 11/2009 | Fan | | 248/346.06 |
| 2010/0200721 A1 * | 8/2010 | Ahn et al. | | 248/346.04 |
| 2010/0243846 A1 * | 9/2010 | Fan | | 248/346.03 |
| 2010/0315041 A1 * | 12/2010 | Tan | | 320/115 |
| 2011/0089302 A1 * | 4/2011 | Fan | | 248/346.03 |

OTHER PUBLICATIONS

U.S. Appl. No. 12/766,104, filed Apr. 23, 2010, Eagle Fan.

* cited by examiner

*Primary Examiner* — Bradley Duckworth
(74) *Attorney, Agent, or Firm* — Rabin & Berdo, P.C.

(57) ABSTRACT

An apparatus for holding handheld devices is provided, including a receiving base, an upper cover, a locking unit, at least a resilient unit and at least a weight allocation unit. The receiving base has a shell forming an accommodation space with an upward opening, and at least a concealing space inside. One side of the upper cover is coupled to the receiving base. The locking unit is responsible for affixing the closing, opening or holding positions between the upper cover and the receiving base. When the locking unit is in unlocked state, the resilient unit provides a force to lift the upper cover to the maximum opening position. The weight allocation unit is housed inside the concealing space. The electronic device can be held between the upper cover and the receiving base with a tilt angle.

10 Claims, 6 Drawing Sheets

APPARATUS FOR HOLDING HANDHELD DEVICES

FIELD OF THE INVENTION

The present invention generally relates to an apparatus for holding handheld devices, and more specifically to a clamping apparatus for holding and affixing handheld devices inside a vehicle

BACKGROUND OF THE INVENTION

Many contemporary apparatuses for holding portable electronic devices are to clamp on both sides of the device so as to affix to a fixed position. This approach does not cause much inconvenience if the user does not need to view the screen of the electronic device often. However, for devices such as GPS or smart phone, which the user often needs to view the message shown on the screen of the device, the user must be able to adjust the viewing angle of the device to read after the device is clamped and affixed, especially when the ambient light, such as sun, is too bright to interfere the viewing of the message shown on the device screen.

To address the above needs, the inventor has applied for an U.S. patent (application Ser. No. 12/766,104). However, further enhancement may be required when the portable device may swirl and move inside the vehicle in a winding road. Therefore, the present invention provides further enhancement to the prior application.

SUMMARY OF THE INVENTION

The primary object of the present invention is to provide a convenient apparatus for holding handheld devices, highly portable, light-shielding and easy to clamp, hold and affix to a location. Because the apparatus is of a proper weight, the friction between the apparatus and the flat surface above the dash board will steady the apparatus from movement. When clamping an electronic device, the apparatus clamps on the top and the bottom edges of the electronic device so that the electronic device is placed inside the apparatus with a tilt angle. The apparatus provides light-shielding to enable clear viewing of the messages displayed on the device screen.

Another object of the present invention is to provide a clamping apparatus with simple structure. By simplifying the locking unit between the receiving base and the upper cover, the apparatus can be operated more conveniently and can be manufactured at a reduced cost.

To achieve the above objects, the present invention provides an apparatus for holding handheld devices, including a receiving base, an upper cover, a locking unit, at least a resilient unit and at least a weight allocation unit. The receiving base has a shell forming an accommodation space with an upward opening, and at least a concealing space inside. One side of the upper cover is coupled to the receiving base. The locking unit is responsible for affixing the closing, opening or holding positions between the upper cover and the receiving base. When the locking unit is in unlocked state, the resilient unit provides a force to lift the upper cover to the maximum opening position. The weight allocation unit is housed inside the concealing space.

The foregoing and other objects, features, aspects and advantages of the present invention will become better understood from a careful reading of a detailed description provided herein below with appropriate reference to the accompanying drawings.

BRIEF DESCRIPTION OF THE DRAWINGS

The present invention can be understood in more detail by reading the subsequent detailed description in conjunction with the examples and references made to the accompanying drawings, wherein.

DETAILED DESCRIPTION OF THE PREFERRED EMBODIMENTS

Figure 1:
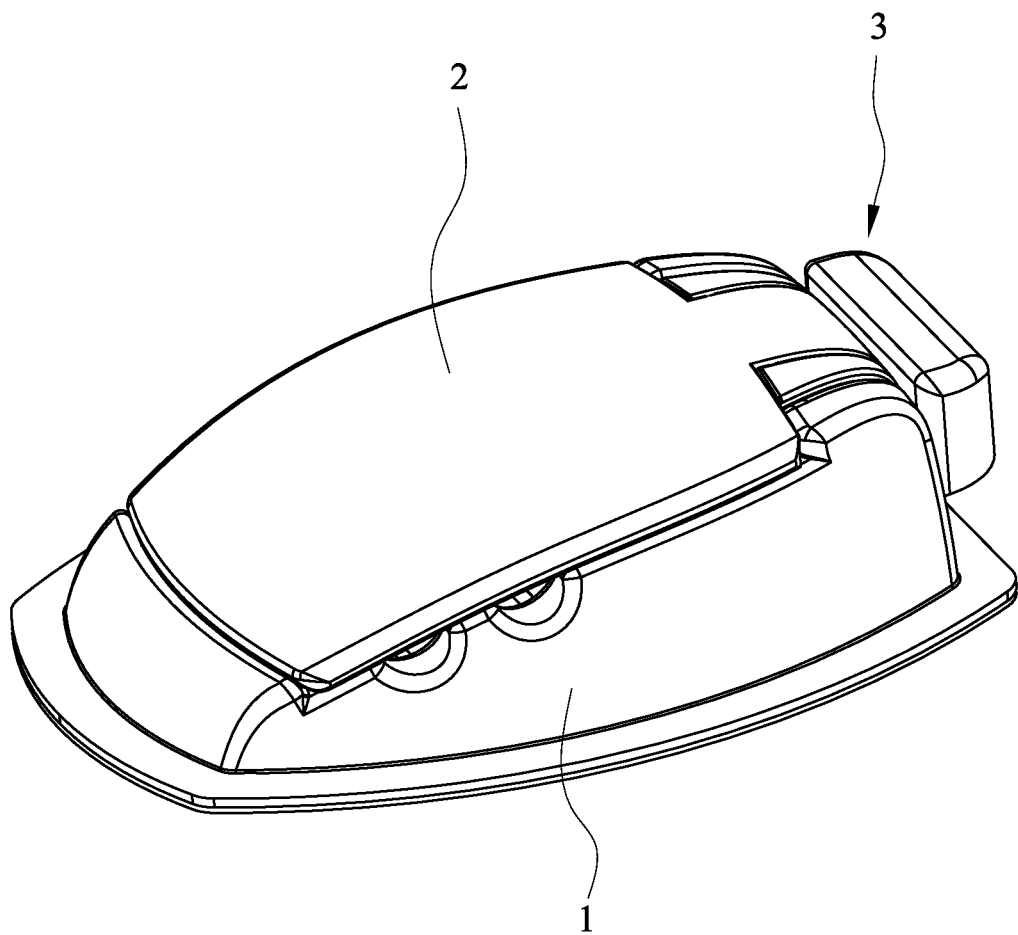
FIG. 1 shows a schematic view of an apparatus for holding handheld devices according to the invention.
Figure 2:
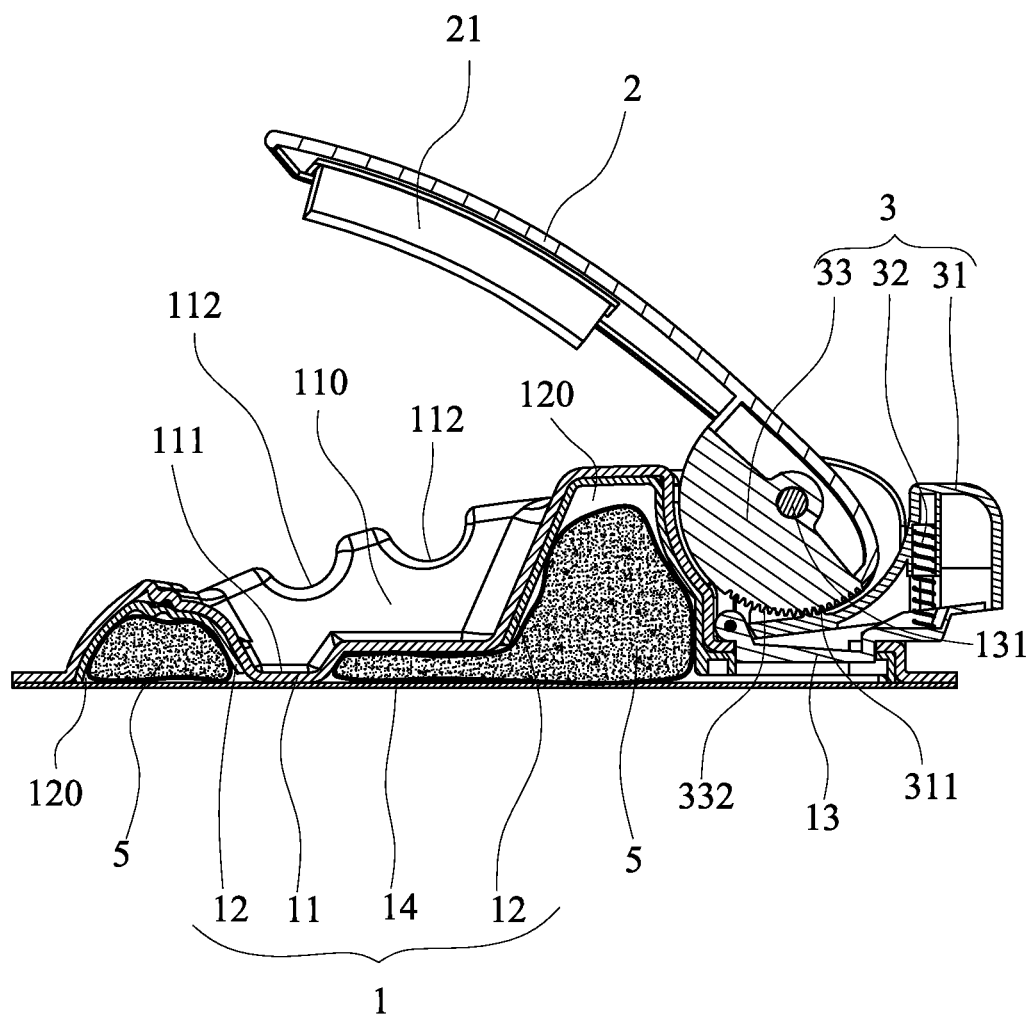
FIG. 2 shows a cross-sectional view with upper cover open according to the present invention.

FIG. 1 and FIG. 2 show a schematic view and a cross-sectional view of the apparatus for holding handheld devices according to the present invention. The apparatus includes a receiving base 1, an upper cover 2, a locking unit 3, at least a resilient unit 4 and at least a weight allocation unit 5. One side of upper cover 2 is coupled to receiving base 1. Locking unit 3 and resilient unit 4 are both located within the area of coupling structure of receiving base 1 and upper cover 2. Locking unit 3 is responsible for locking the relative position between upper cover 2 and receiving base 1, including in closed, open or holding state. When locking unit 3 is in unlocked state, resilient unit 3 provides a force to lift upper cover 2 up to open. Weight allocation unit 4 is located inside receiving base 1 to increase the overall weight of the apparatus. In this manner, when the electronic device is held between the apparatus, receiving base 1 and upper cover 2 clamp the bottom edge and the top edge of the electronic device respectively so that the electronic device is affixed between upper cover 2 and receiving base 1 with a tilt angle.

Figure 3:
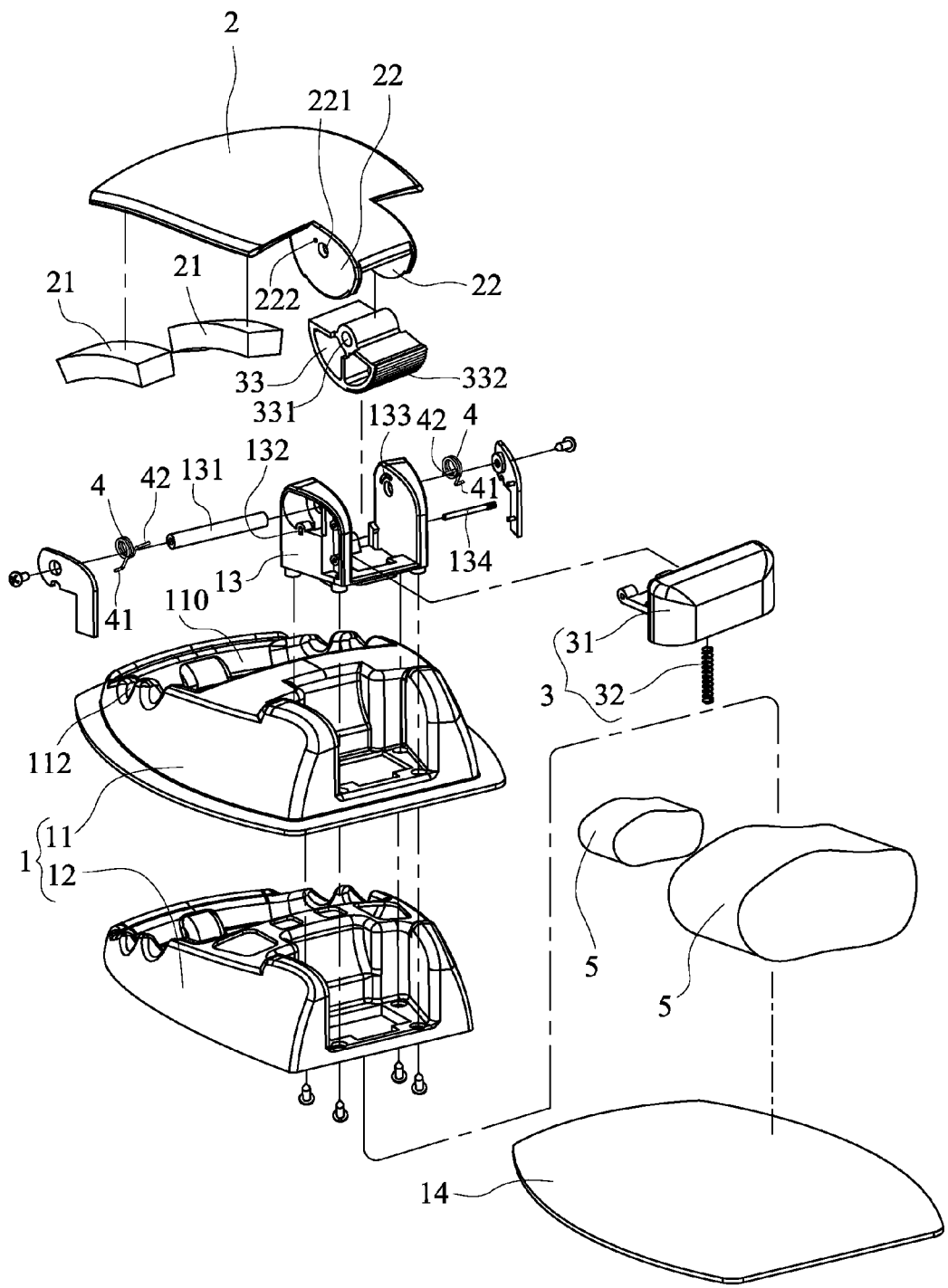
FIG. 3 shows an exploded view according to the present invention.

The following describes the details of the structure of the present invention. As shown in FIG. 3, receiving base 1 includes a surface element 11, a skeleton structure shell 12, a coupling axial frame 13, and an anti-slipping element 14. Surface element 11 is a soft lining leather attached to the outer surface of skeleton structure shell 12. Skeleton structure shell 12 is made of a more rigid material so that will not deform. With the surface element 11 and skeleton structure shell 12 forming the main body of receiving base 1, receiving base 1 has the appearance of an accommodation space 110 and an inside concealing space 120, as shown in FIG. 2. Accommodation space 110 can provide space to accommodate the held electronic device, as well as for connecting wires for electronic devices when not in use. The shell of receiving base 1 forms at least a first positioning area 111 and a plurality of second positioning areas 112 at the bottom and two sides of accommodation space 110. First positioning area 111 includes concave trenches and second positioning areas 112 are the arc-shaped concaves formed on both sides of receiving base 1. Anti-slipping element 14 is made of a anti-slippery fabric, located at the bottom of receiving base 1. Anti-slipping element 14 is attached surface element 11 at the edge so as to conceal concealing space 120 completely. Coupling axial frame 13 is a U-shaped structure. After assembly, coupling axial frame 13 is locked to skeleton structure shell 12 so that upper cover 2 is coupled to receiving base 1. Also, resilient unit 4 and locking unit 3 are both located at coupling axial frame 13.

The surface of the inner wall of upper cover 2 facing receiving base 1 includes at least a contact element 21, made of soft foam or other compressible material for deformation. When compressed and deformed, contact element 21 can increase the friction between the held electronic device and the apparatus as well as compensate the slight size difference when holding. In addition, upper cover 2 includes two parallel axial walls 22, each having a axial hole 221. Coupling axial frame 13 uses a first axis 131 to penetrate axial holes 221 so that upper cover 2 is coupled to receiving base 1.

Resilient unit 4 is a torsion spring in the present embodiment. A first end 41 of the two ends of torsion spring is inserted into positioning hole 132 of coupling axial frame 13. Second end 42 is inserted into engaging hole 222 of axial wall 22 of upper cover 2. To avoid interfering with the rotation of upper cover 2 coupling axial frame 13 includes an arc trench 133 to allow second end 42 to pass. With two ends of resilient unit 4 affixed to components on upper cover 2 and receiving base 1, when locking unit 3 is in unlocked state, resilient unit 4 will automatically life upper cover 2 up. The maximum angle of lifting is restricted by the range of arch trench 133.

Locking unit 3 includes a wrench element 31, at least a spring 32 and a rotational element 33. Rotational element 33 has a hemisphere shape, and is located between two axial walls 22 of upper cover 2 when assembled, so as to rotate with upper cover synchronously. Rotational element 33 includes an axial hole 331, and is also affixed to coupling axial frame 13 through first axis 131. The arc outer wall of rotational element 33 includes a plurality of teeth 332. Wrench element 31 uses a second axis 134 to affix to coupling axial frame. Spring 32 is located between the body of wrench element 31 away from the coupling junction and coupling axial frame 13 to provide wrench element 31 the force to automatically restore position upwards after being pressed down. The inner wall of wrench element 31 facing upper cover 2 includes a plurality of restraining teeth 311 at the coupling location for engaging teeth 332 of rotational element 33 to prevent rotational element 33 from rotating when in holding state so as to affix the opening angle of upper cover 2.

Weight allocating unit 5 is to increase the overall weight of the apparatus for increasing the friction so that receiving base 1 will not move casually when placed on a flat surface when the vehicle is in motion. Weight allocation unit 5 can be a bag of heavy objects, such as, sand, pebbles, stones or metal powder The grains of the heavy objects should be small so that when the surface is uneven, weight allocation unit 5 can deform to press on anti-slipping element 14 of receiving base 1 so that anti-slipping element 14 can be more attached to the surface placed on to affix the apparatus.

Figure 4:
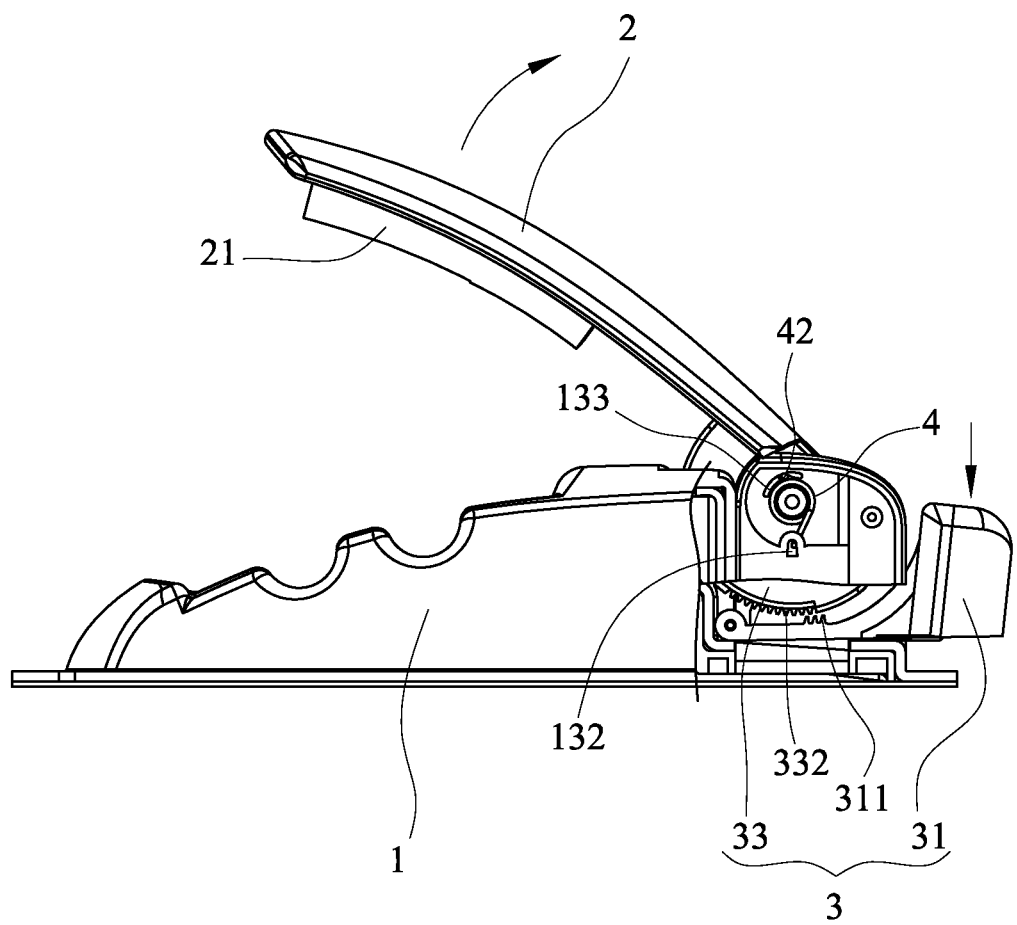
FIG. 4 shows a schematic view of the partial structure according to the present invention.
Figure 5:
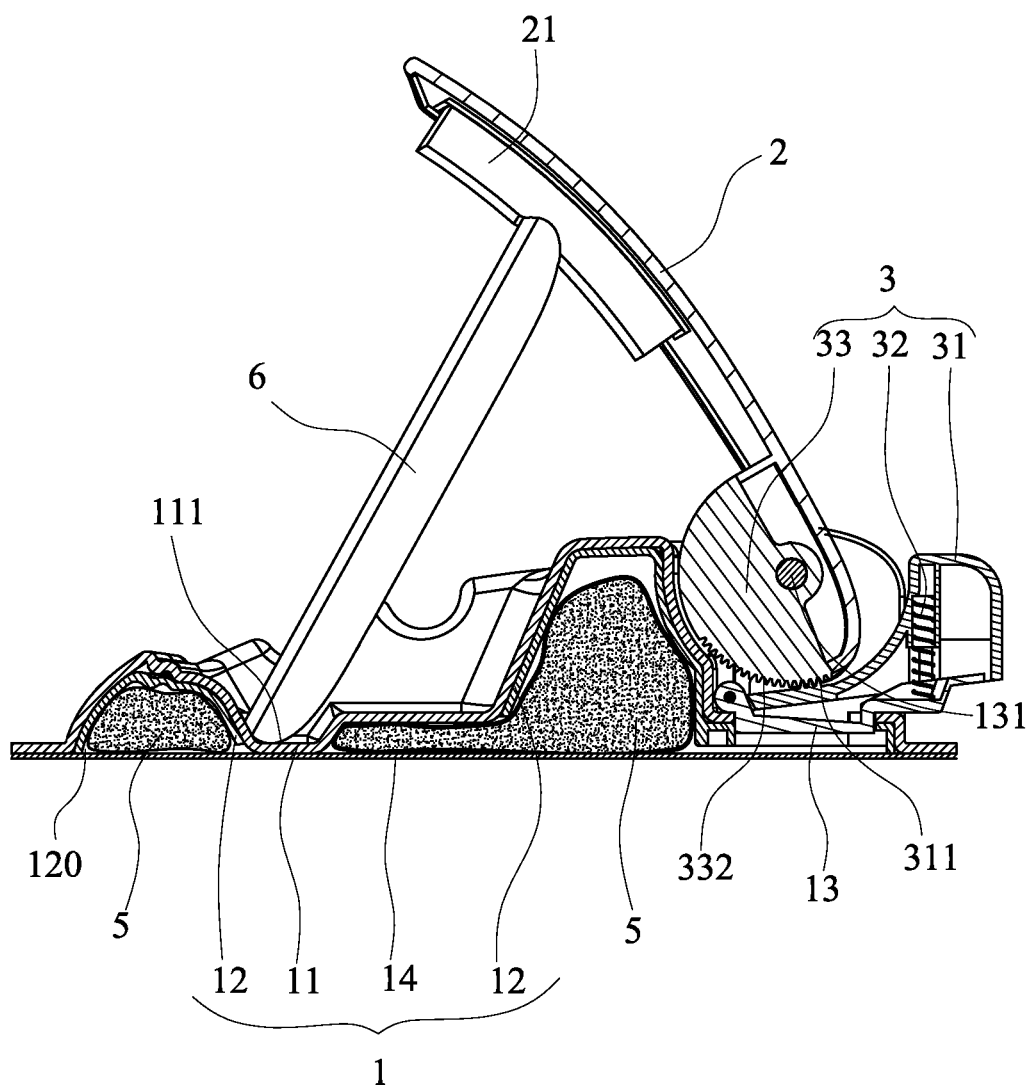
FIG. 5 shows a schematic view of the apparatus holding an electronic device according to the present invention.

The present invention also allows electronic device 6 to be held vertically or horizontally. The following shows the present invention in actual application. As shown in FIG. 4, to use the apparatus of the present invention, press wrench element 31 of locking unit 3 so that restraining teeth 311 of wrench element 31 are disengaged from teeth 332 of rotational element 33. Therefore, resilient unit 4 can provide a force to lift upper cover 2 up, with opening angle limited by arc trench 133. The upper cover is not fully opened in FIG. 4. As shown in FIG. 5, the apparatus of the present invention holds an electronic device 6 vertically. The bottom edge of electronic device 6 is inside first positioning area 111 of receiving base 1, and the top edge contacts contact element 21 of upper cover 2. Contact element 21 can deform to increase the friction against electronic device 6. By changing the top edge of electronic device 6 to contact different positions on contact element 21, the tilt angle of electronic device 6 can be changed. In addition, upper cover 2 can provide good light-shielding effect so that the message displayed on device screen can be clearly viewed. Locking unit 3 uses wrench element 31 to engage rotational element 33 to affix the opening angle of upper cover 2.

Figure 6:
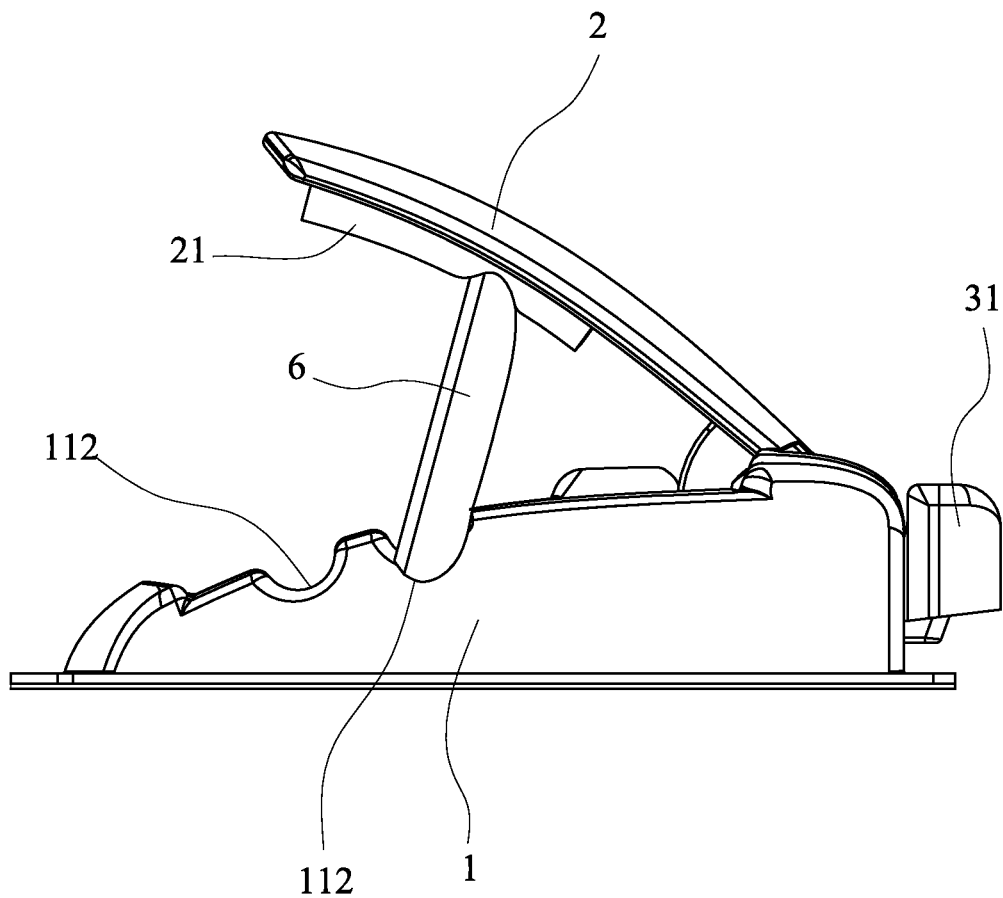
FIG. 6 shows a cross-sectional view of the apparatus holding an electronic device according to the present invention.

FIG. 6 shows a schematic view of holding an electronic device horizontally according to the present invention. In this position, the top edge and the bottom edge of the electronic device in horizontal position are also being held by upper cover 2 and receiving base 1, respectively. The bottom edge of the electronic device is also located within second positioning areas 112 on both sides of receiving base 1. The top edge is held by contact element 21. The deformation of contact element 21 also compensates the slight size difference as described earlier.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. An apparatus for holding handheld devices, comprising:
   a receiving base having a main body that forms an accommodation space for allowing removable placement of a handheld device therewithin, and the main body further forming an inside concealing space;
   an upper cover rotatably coupled to said receiving base;
   a weight allocation unit located inside said concealing space;
   a locking unit that includes
      a rotational element engaged to said upper cover to rotate with said upper cover synchronously, said rotational element including an outer wall that has a plurality of rotational teeth,
      a wrench element having one end coupled to said receiving base, the wrench element having a restraining tooth, the restraining tooth having a first position in which the restraining tooth engages the rotational teeth so as to stop rotation of the rotational element and thereby stop relative movement between said upper cover and said receiving base with an opening angle formed therebetween, said wrench element further having a second position in which the restraining tooth is disengaged from said rotational teeth to allow for relative movement between said upper cover and said receiving base, and
      a spring located between said wrench element and said receiving base, the spring to provide a force to urge said wrench element towards the first position,
      wherein the wrench element is movable in a direction against the force of the spring so as to move from the first position to the second position; and
   a resilient unit, wherein said resilient unit provides an upward force while the wrench is in the second position so as to lift said upper cover relative to the receiving base to change the opening angle between said upper cover and said receiving base.

2. The apparatus as claimed in claim 1, wherein said upper cover includes
   a contact element that is deformable by compression, and an inner wall facing said receiving base, wherein the inner wall has the contact element attached thereto.

3. The apparatus as claimed in claim 1, wherein said main body of comprises a first positioning area at bottom of said accommodation space, wherein said first positioning area is a concave trench.

4. The apparatus as claimed in claim 3, wherein said main body comprises at least a second positioning area on both sides of said accommodation space, wherein said second positioning area is a concave with an upward opening.

5. The apparatus as claimed in claim 1, wherein said resilient unit is a torsion spring with one end affixed to said upper cover and another other end affixed to said receiving base.

6. The apparatus as claimed in claim 1, wherein
said receiving base includes a coupling axial frame,
the rotational element is engaged to a rotational axis of said upper cover to rotate with said upper cover synchronously,
the wrench element has the one end coupled to said coupling axial frame, and
the spring is located between said wrench element and said coupling axial frame,
further wherein said upper cover is coupled to the coupling axial frame on said receiving base.

7. The apparatus as claimed in claim 6, wherein said receiving base further comprises
a surface element that is a soft lining leather material,
a skeleton structure shell having an outer wall, and
an anti-slipping element made of anti-slippery fabric and located at a bottom of said receiving base for concealing said concealing space completely,
wherein said surface element is glued to the outer wall of said skeleton structure shell,
further wherein said main body is formed by said surface element and said skeleton structure shell.

8. The apparatus as claimed in claim 1, wherein said weight allocation unit is bag filled with any combination of sand, grainy stone and metal powder.

9. The apparatus as claimed in claim 1, wherein the restraining tooth is engageable with a first of the rotational teeth so as to stop relative movement between the upper cover and the receiving base at a first maximum distance formed therebetween,
further wherein the restraining tooth is engageable with a second of the rotational teeth so as to stop relative movement between the upper cover and the receiving base at a second maximum distance formed therebetween that is different than the first maximum distance.

10. The apparatus as claimed in claim 1, wherein in the second position the wrench element is stationary while the rotational element rotates.

* * * * *